United States Patent
Ito et al.

(10) Patent No.: US 6,814,406 B2
(45) Date of Patent: Nov. 9, 2004

(54) SEAT VERTICAL POSITION ADJUSTING DEVICE

(75) Inventors: Sadao Ito, Anjo (JP); Genta Moriyama, Anjo (JP); Naoaki Hoshihara, Obu (JP); Hideo Nihonmatsu, Anjo (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/369,632

(22) Filed: Feb. 21, 2003

(65) Prior Publication Data

US 2003/0178875 A1 Sep. 25, 2003

(30) Foreign Application Priority Data

Feb. 21, 2002 (JP) ........................................ 2002-045196

(51) Int. Cl.[7] .............................. A47C 3/025; B60N 2/02
(52) U.S. Cl. ................................ 297/284.11; 297/362
(58) Field of Search ............................. 297/284.11, 362

(56) References Cited

U.S. PATENT DOCUMENTS

| | | | | |
|---|---|---|---|---|
| 4,583,781 A | * | 4/1986 | Hatsutta et al. | 297/284.11 |
| 4,648,575 A | * | 3/1987 | Kawade | 248/371 |
| 4,693,513 A | * | 9/1987 | Heath | 297/284.11 |
| 4,753,479 A | * | 6/1988 | Hatsutta et al. | 297/284.11 |
| 5,277,672 A | * | 1/1994 | Droulon et al. | 475/176 |
| 5,486,036 A | | 1/1996 | Ito et al. | |
| 5,881,854 A | * | 3/1999 | Rougnon-Glasson | 192/15 |
| 5,908,220 A | | 6/1999 | Bauer et al. | |
| 6,398,308 B1 | * | 6/2002 | Becker et al. | 297/367 |
| 6,435,610 B2 | * | 8/2002 | Kondo et al. | 297/284.11 |
| 2001/0022460 A1 | | 9/2001 | Kondo et al. | |
| 2002/0167210 A1 | * | 11/2002 | Dill | 297/362 |

FOREIGN PATENT DOCUMENTS

| | | | |
|---|---|---|---|
| DE | 1 555 711 | 10/1969 | |
| DE | 31 29 672 C1 | 10/1982 | |
| DE | 32 01 309 A1 | 7/1983 | |
| DE | 37 21 064 A1 | 1/1989 | |
| EP | 0 526 842 B1 | 2/1993 | |
| FR | 2 450 713 | 10/1980 | |
| GB | 2 049 027 A | 12/1980 | |
| JP | 60-191837 A | 9/1985 | |
| JP | 62020736 A * | 1/1987 | B60N/1/06 |
| JP | 6-99769 A | 4/1994 | |
| JP | 2000-190762 A | 7/2000 | |
| JP | 2000-219767 A | 8/2000 | |

* cited by examiner

Primary Examiner—Peter M. Cuomo
Assistant Examiner—Sarah C. Burnham
(74) Attorney, Agent, or Firm—Burns, Doane, Swecker & Mathis, L.L.P.

(57) ABSTRACT

A seat vertical position adjusting device includes a driving mechanism equipped to a base plate portion of a seat cushion for driving a cushion frame to be movable in the vertical direction relative to the base plate portion. The driving mechanism includes a shaft having a first axial portion and a second axial portion which is positioned on the first axial portion, and eccentrically rotated relative to the first axial portion, a first internal gear, a second internal gear, and a pinion gear is mounted on the second axial portion. The number of gear teeth of the first internal gear is less than the number of gear teeth of the second internal gear at least by one.

20 Claims, 6 Drawing Sheets

SEAT VERTICAL POSITION ADJUSTING DEVICE

CROSS REFERENCE TO RELATED APPLICATIONS

This application is based on and claims priority under 35 U.S.C. § 119 with respect to a Japanese Patent Application 2002-045196, filed on Feb. 21, 2002, the entire content of which is incorporated herein by reference.

FIELD OF THE INVENTION

This invention generally relates to a seat vertical position adjusting device for lifting up and down a front-end portion of a seat cushion so as to adjust a height of the front-end portion thereof.

BACKGROUND OF THE INVENTION

A conventional seat vertical position adjusting device has been disclosed as a Japanese Patent Laid-Open published as No. 2000-190762. A driving mechanism including a brake mechanism and a pinion gear is equipped to a frame portion supporting a front-end portion of the seat cushion. The frame portion is pivotably supported by a bracket member mounted on a floor. A sector gear possessing a large pitch circle is assembled to the bracket member and is engaged with the pinion gear. The pinion gear can be rotated via the brake mechanism in response to operation of an operation handle so that the frame portion is pivotably rotated, thereby the front-end portion of the seat cushion can be effectively adjusted to be lifted up or down. Further, the front-end portion of the seat cushion can be maintained at an intended position by use of the brake mechanism.

However, the operating force for operating the seat vertical position adjusting device disclosed above is increased when an occupant is seated on the seat cushion. In this case, a speed reducing ratio of the pinion gear and the sector gear can be increased for reducing the operating force of the seat vertical position adjusting device. However, the pinion gear can be downsized with a certain limitation so as not to weaken the engagement force of the pinion gear with the sector gear. On the other hand, a size-up of the sector gear results in a size-up of the seat vertical position adjusting device and an increase of the weight thereof. Accordingly, the speed reducing ratio can be increased only to a certain level so that a relatively large operating force is required to operate the seat vertical position adjusting device.

The present invention therefore seeks to provide an improved seat vertical position adjusting device which can be operated with a small operating force even when the front-end portion of the seat cushion is applied with an occupant's load.

SUMMARY OF THE INVENTION

A seat vertical position adjusting device of the present invention includes a seat cushion applied with a load when an occupant is seated thereon, a base plate portion supporting the seat cushion, a cushion frame housed in the seat cushion and supported by the base plate portion so as to be movable in a vertical direction, and a driving mechanism equipped to one of the cushion frame and the base plate portion for driving the cushion frame to be movable in the vertical direction relative to the base plate portion.

The driving mechanism includes a shaft having a first axial portion and a second axial portion which is positioned on the first axial portion, eccentrically rotated relative to the first axial portion, and connected to a driving member, a stationary gear member fixed to the one of the cushion frame and the base plate portion, mounted on one side of the first axial portion, and having a first internal gear, a driving arm connected to the other one of the cushion frame and the base plate portion, mounted on the other side of the first axial portion, having a second internal gear of which number of gear teeth is different from the number of gear teeth of the first internal gear, and disposing the second axial portion between the driving arm and the stationary gear member, and a pinion gear mounted on the second axial portion and engaged with the first and second internal gears.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

Hereinafter, a seat vertical position adjusting device 40 according to first and second embodiments of the present invention is described referring to the accompanying drawings.

Figure 1:
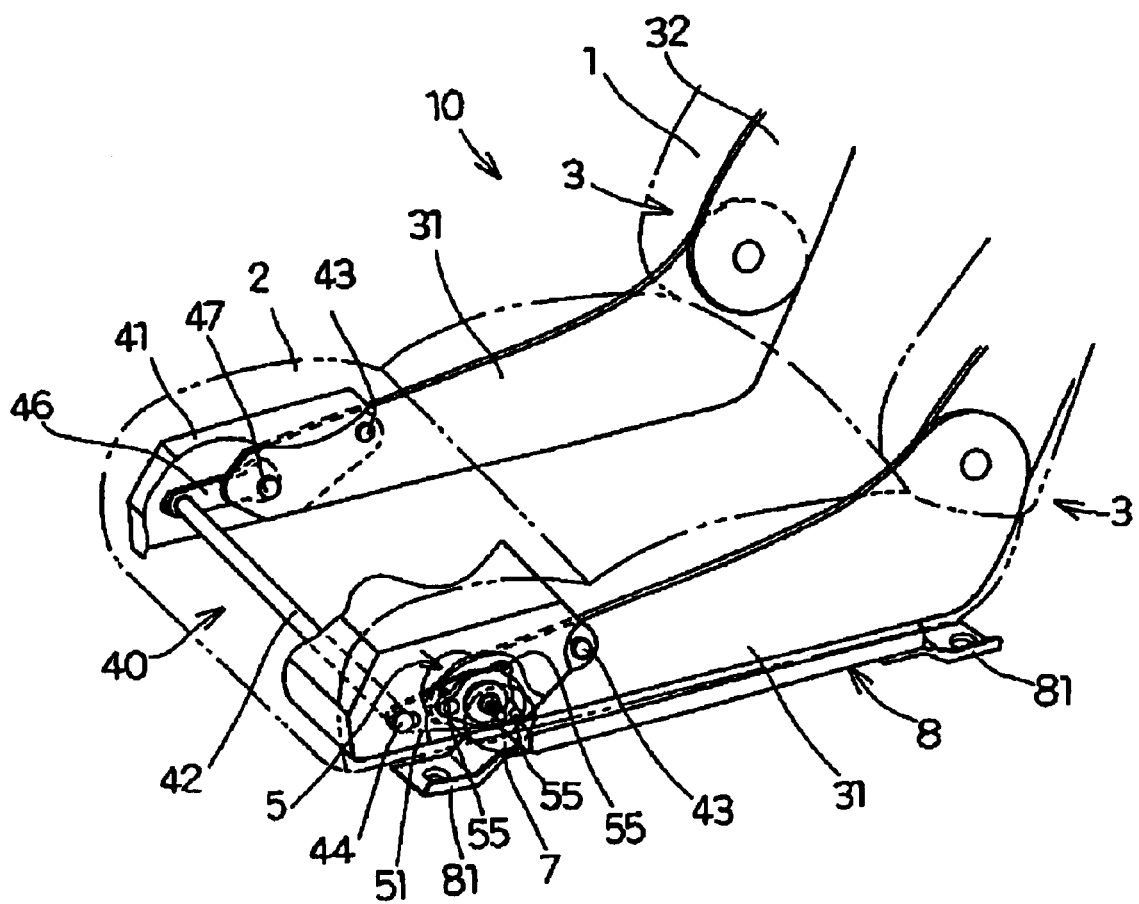
FIG. 1 is a perspective view illustrating a seat vertical position adjusting device according to a first embodiment of the present invention.
Figure 2:
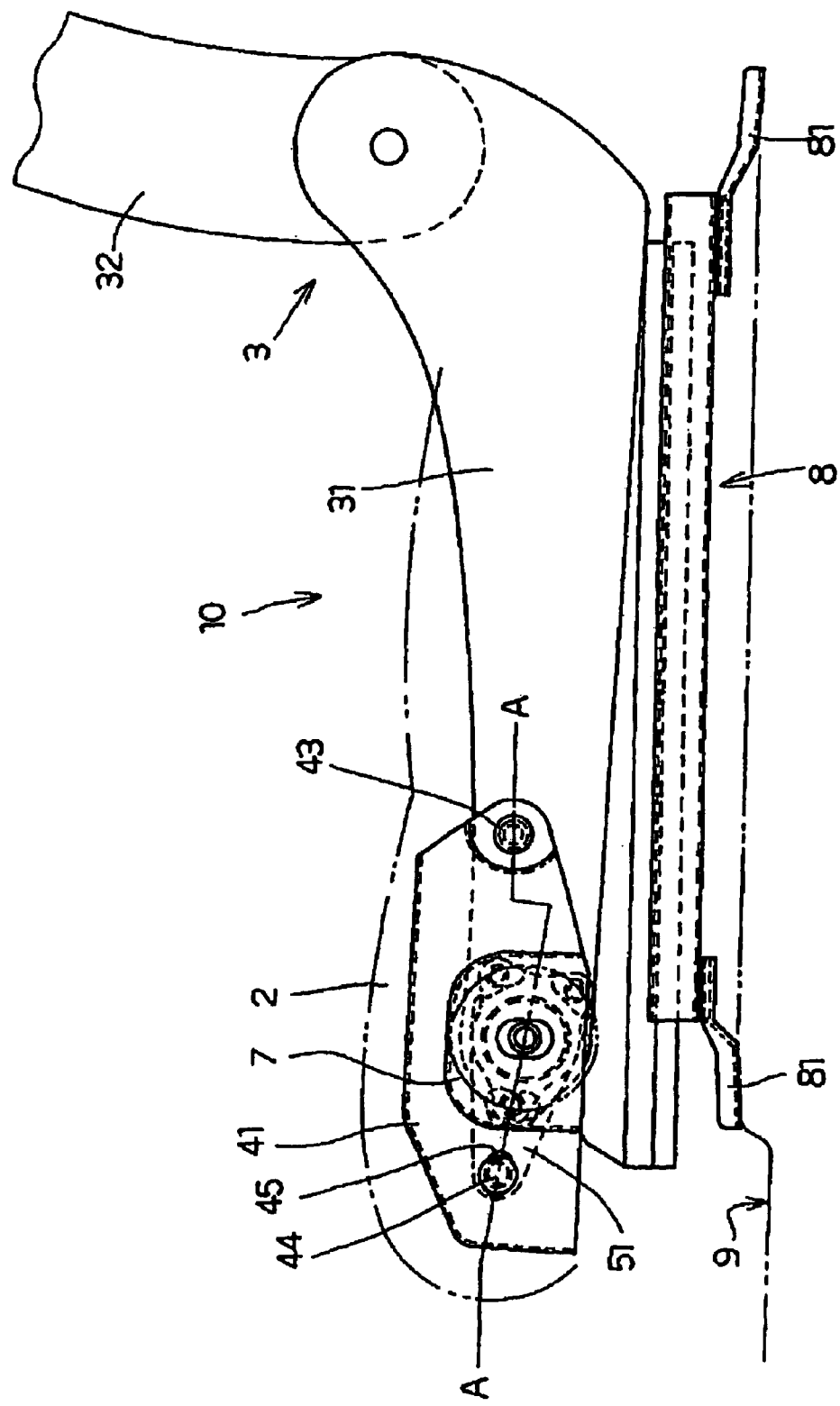
FIG. 2 is a side view of the seat vertical position adjusting device illustrated in FIG. 1.

As especially seen in FIGS. 1 and 2, a seat 10 provided with the seat vertical position adjusting device 40 includes a seat cushion 2 as an occupant's seated portion and a seat back 1 for the occupant to recline thereon. The seat 10 is mounted on a floor 9 via a seat sliding mechanism 8 which is arranged at a lower portion of the seat cushion 2. As conventionally known, the seat sliding mechanism 8 is fixedly attached to the floor 9 via fixture brackets 81 which are equipped at front and rear portions of the seat 10 and can slidably move the seat 10 in a longitudinal direction, i.e. in a right-hand and left-hand direction in FIG. 2.

Figure 3:
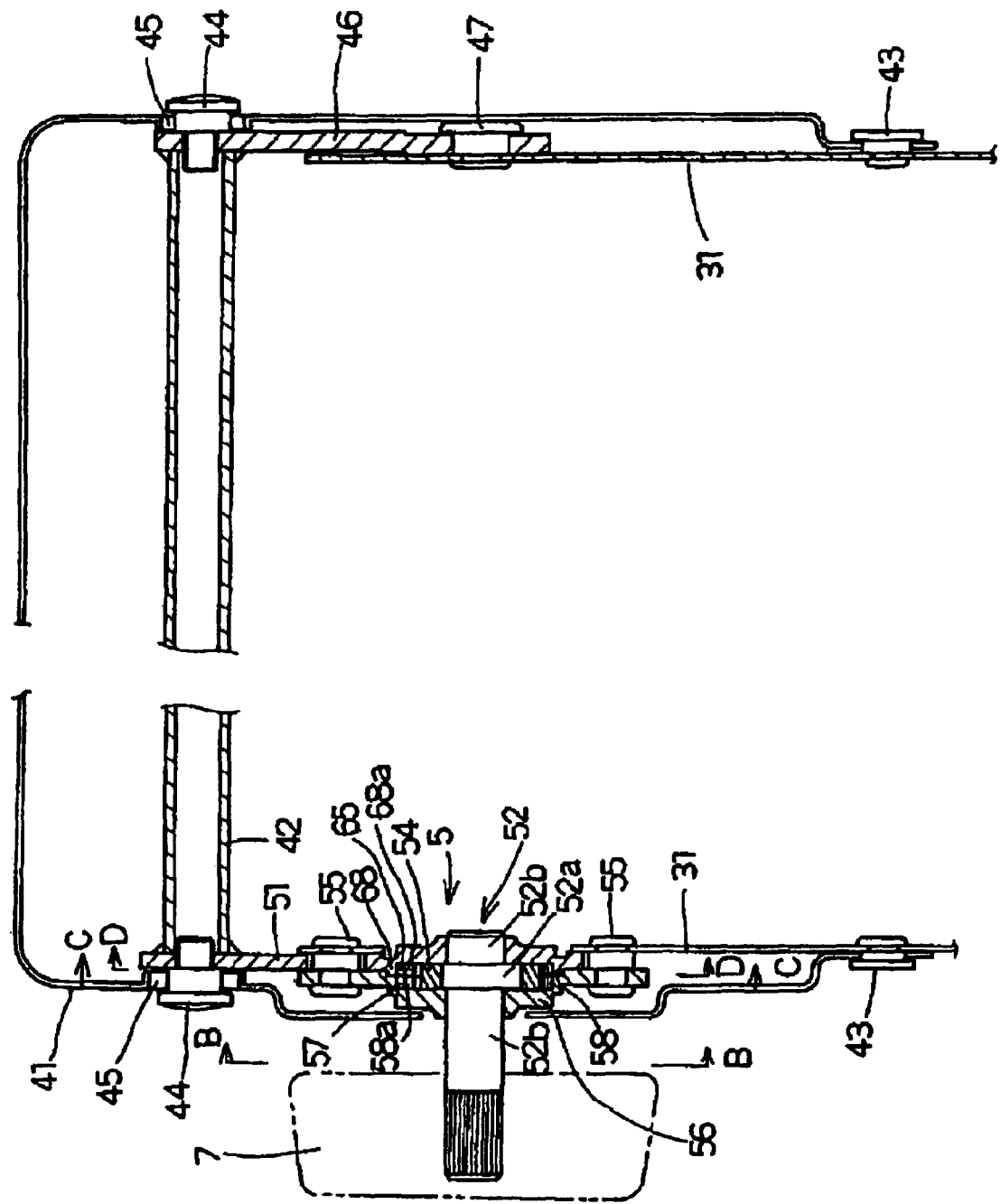
FIG. 3 is a cross sectional view taken along a line A—A in FIG. 2.

As illustrated in FIGS. 1, 2, and 3, a pair of base plate portions 31 are arranged at right and left hand sides of the seat cushion 2 and are fixedly mounted on the seat sliding mechanism 8. The robustness of the seat cushion 2 can be improved by arranging the pair of base plate portions 31 as described above. Each base plate portion 31 possesses a vertically extending portion. A cushion frame 41 is arranged in a lengthwise direction so as to connect front-end portions of the pair of base plate portions 31 and is operatively connected to each vertically extending portion via a pivot 43 so as to be pivotably rotated in a vertical direction. Therefore, the seat cushion 2 can be lifted up and down in response to the pivotable rotation of the cushion frame 41, wherein the vertical position of the seat cushion 2 can be adjusted.

An end portion of an arm (a driven arm) 46 substantially extending in the longitudinal direction is freely rotatably connected to the front-end portion of one of the pair of the base plate portions 31 (a right-hand side in FIG. 3) via a pin 47. A front end of the arm 46 is connected to one end of an interconnecting shaft (an interconnecting bar) 42 with a welding method. The other end of the interconnecting shaft 42 is connected to a tip end of a driving arm 6 of a driving mechanism 5 (described later) according to the first embodiment of the present invention. The arm 46 and the driving arm 6 are assembled to the seat 10 via respective pins 44 disposed in respective elongated holes 45 which are defined in side wall portions of the seat cushion 2 and extend in the longitudinal direction.

Figure 4:
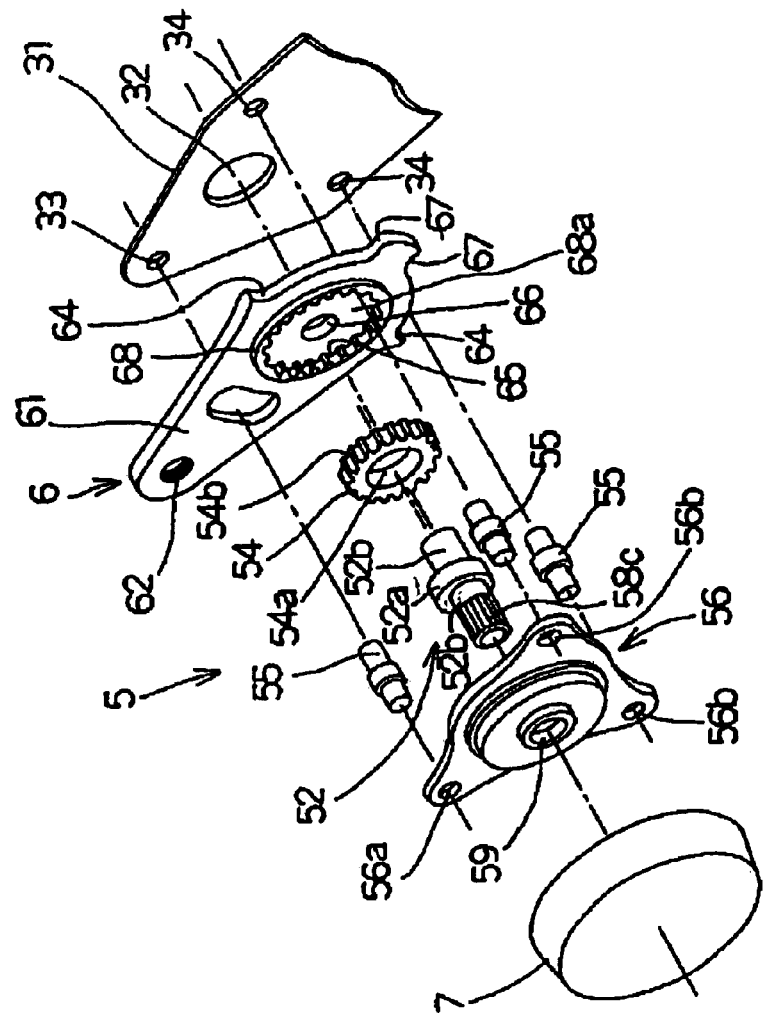
FIG. 4 is an exploded perspective view of a driving mechanism of the seat vertical position adjusting device illustrated in FIG. 1.
Figure 5:
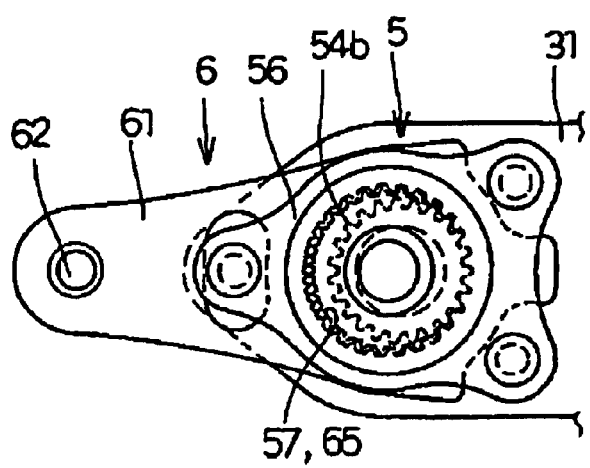
FIG. 5 is a cross sectional view taken along a line B—B in FIG. 3.
Figure 6:
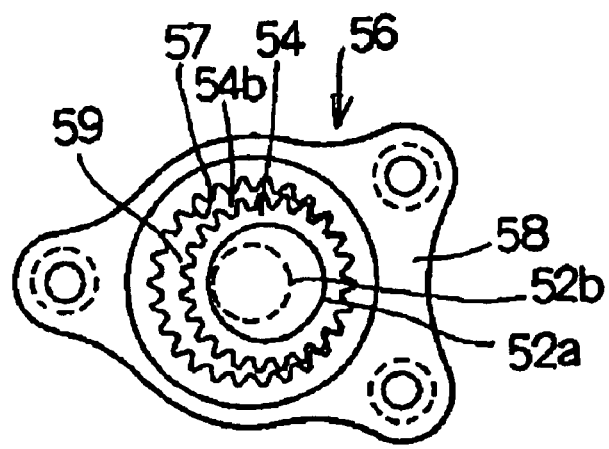
FIG. 6 is a cross sectional view taken along a line C—C in FIG. 3.
Figure 7:
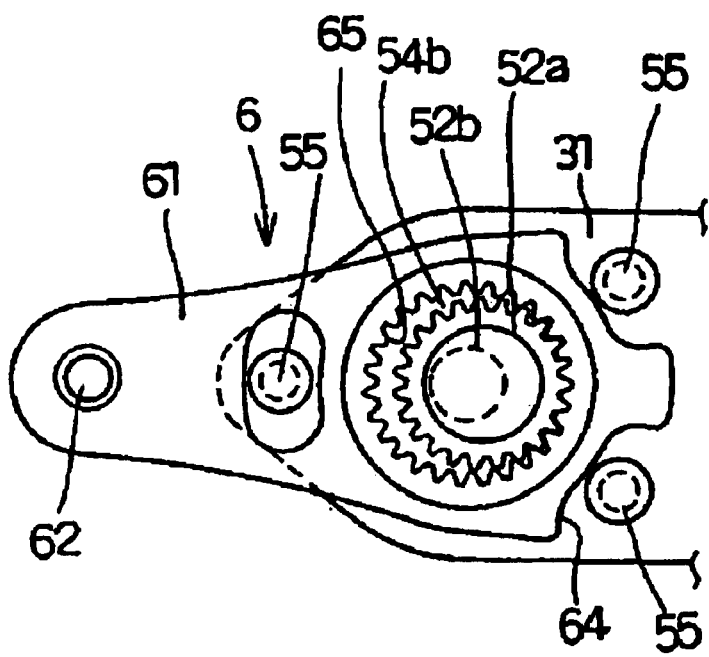
FIG. 7 is a cross sectional view taken along a line D—D in FIG. 3.

The driving mechanism 5 is provided with main components such as stationary gear member 56 and the driving arm 6. The driving mechanism 5 is assembled to a side surface at the front-end portion of the other one of the pair of base plate portions 31 (the left-hand side in FIG. 3) by fixing the stationary gear member 56 thereto by means of three pins 55. As especially seen in FIG. 4, both of the stationary gear member 56 and the driving arm 6 possess approximately flat plate-shaped structures respectively. A side surface of the driving arm 6 comes in contact with a side surface of the stationary gear member 56 so as to be rotatably engaged therewith. As illustrated in FIG. 3, a recessed portion 58 with an approximately circle-shaped structure is defined at the side surface of the stationary gear member 56 so as to receive a rotational shaft of a rotor 68. The rotor 68 with an approximately circle-shaped projection is provided at the side surface of the driving arm 6, the side surface thereof facing the side surface of the stationary gear member 56. The rotor 68 can be smoothly rotated with almost no play between the recessed portion 58.

As illustrated in FIGS. 3, 5 through 7, a recessed portion 58a is defined on the side surface of the stationary gear member 56. The recessed portion 58a possesses a substantially smaller diameter than a diameter of the recessed portion 58 and is arranged to be coaxial therewith. A first internal gear 57 is provided at an inner peripheral surface of the recessed portion 58a. In the meantime, a recessed portion 68a is defined on the side surface of the driving arm 6. The recessed portion 68a possesses a substantially smaller diameter than a diameter of the rotor 68 and is arranged to be coaxial therewith. A second internal gear 65 is provided at an inner peripheral surface of the recessed portion 68a. The first internal gear 57 is formed to possess the number of gear teeth less than the number of gear teeth of the second internal gear 65 at least by one. The second internal gear 65 is formed to possess substantially an identical tooth bottom, tip circle, and tooth module to tooth bottom, tip circle, and tooth module of the first internal gear 57. Further, the second internal gear 65 formed to possess a different addendum modification coefficient from one of the first internal gear 57.

A shaft hole 59 defined at a center of the first internal gear 57 is arranged to be substantially coaxial with a shaft hole 66 defined at a center of the second internal gear 65. The shaft 52 is integrally provided with a first axial portion 52b and a second axial portion 52a at a central portion of the first axial portion 52b. The second axial portion 52a possesses a relatively greater diameter than a diameter of the first axial portion 52b. One end of the first axial portion 52b is rotatably disposed in the shaft hole 59 and the other end thereof is rotatably disposed in the shaft hole 66. A central axis of the second axial portion 52a is arranged to be parallel with a central axis of the first axial portion 52b having a predetermined distance thereto. That is, the second axial portion 52a possesses an eccentric axis relative to the central axis of the first axial portion 52b. The second axial portion 52a is disposed in both the recessed portions 58a and 68a when the driving arm 6 is rotatably assembled to the stationary gear member 56.

A pinion gear 54 is rotatably mounted on the second axial portion 52a. A gear portion 54b is defined on an outer peripheral surface of the pinion gear 54 and is engaged with the first and second internal gears 57 and 65. The gear potion 54b is formed to possess substantially an identical gear module to the gear module of the first and second internal gears 57 and 65. The gear portion 54b can be engaged with the first and second internal gears 57 and 65 with a minimum backlash therebetween so as to be smoothly rotated.

As especially seen in FIGS. 1 and 3, the shaft 52 penetrates the stationary gear member 56 and outwardly extends in a width direction of the seat 10. An operation handle (a driving member) 7 is fixedly assembled to a tip end portion of the shaft 52. The second axial portion 52a eccentrically orbits around the central axis of the first axial portion 52b in response to rotation of the operation handle 7. The pinion gear 54 is rotated on the second axial portion 52a being engaged with the first and second internal gears 57 and 65 and eccentrically orbits around the first axial portion 52b. Therefore, the driving arm 6 can be rotated relative to the stationary gear member 56 by the difference of the number of gear teeth between the first and second gears 57 and 65 when the operation handle 7 is rotated with a 360 degree. A speed reducing ratio of the rotation of the driving arm 6 relative to the rotation of the operation handle 7 can be greatly increased by increasing the number of gear teeth of the first and second gears 57 and 65 and by setting the difference of the gear teeth number to be only one. In this case, the pinion gear 54 is not required to be downsized so that the engagement between the pinion gear 54 and the first and second gears 57 and 65 can be effectively improved.

Therefore, each front end of the driving arm 6 and the arm 46 interconnected to the driving arm 6 via the interconnecting shaft 42 can be lifted up and down in the vertical direction by operating the operation handle 7 with a small operating force. For example, even when load has been applied to the front-end portion of the seat cushion 2 connected to the driving arm 6 and the arm 46 via the pins 44, the front-end portion of the seat cushion 2 can be lifted up and down in the vertical direction by operating the operation handle 7 with a small operating force.

As illustrated in FIGS. 4 through 7, two shoulder portions (first and second shoulder portions) 64 are defined at an edge portion of the driving arm 6. The rotational range of the tip end of the driving arm 6 can be effectively limited by the shoulder portions 64 to come in contact with the two pins (first and second pins) 55.

According to the first embodiment of the present invention, the seat surface height of the seat cushion 2 can be adjusted by the seat vertical position adjusting device 40 with the above-described structure in response to the manual rotation of the operation handle 7. The driving mechanism 5 according to the embodiment of the present invention can possess a relatively large speed reducing ratio. Therefore, the seat cushion 2 can be effectively maintained at an intended position even when being applied with an occupant's load, load due to vibration during a vehicle being traveling, or the like.

Figure 8:
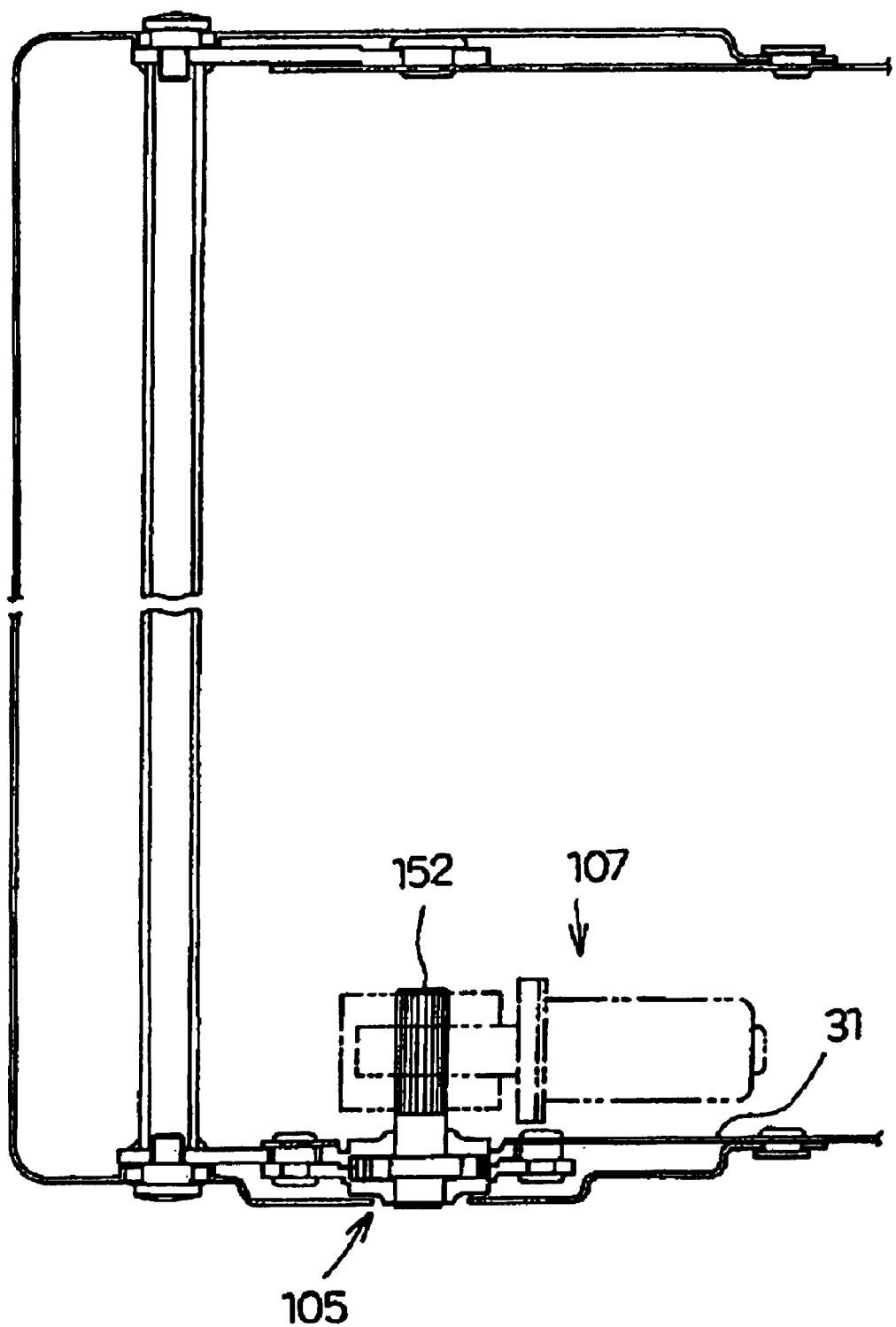
FIG. 8 is a cross sectional view of a seat vertical position adjusting device according to a second embodiment of the present invention.

According to the first embodiment of the present invention, the shaft 52 is rotatably driven by the seat vertical position adjusting device 40 having the operation handle 7 (the driving member). However, as illustrated in FIG. 8, a driving mechanism 105 according to the second embodiment of the present invention can be substituted for the driving mechanism 5. The driving mechanism 105 is provided with a driving member 107 such as an electric motor. The driving member 107 can be supported by the base plate portion 31 of the seat cushion 2 via a supporting member (not shown) and drives a shaft 152 to be reciprocatedly rotated in a normal direction or in a reverse direction, thereby the seat surface height of the seat cushion 2 can be effectively adjusted. The driving mechanism 105 possesses a relatively large speed reducing ratio as well. Therefore, the seat cushion 2 can be smoothly lifted up and down in the vertical direction so as to adjust the seat surface height of the seat cushion 2 even when being applied with the occupant's load.

According to the embodiments of the present invention, the driving mechanism 5 and 105 can be ensured with a relatively strong gear engagement and a relatively large speed reducing ratio. Therefore, the seat cushion 2 can be lifted up and down by operating the seat vertical position adjusting device 40 with an only small operating force so as to adjust the seat surface height of the seat cushion 2 even when being applied with the occupant's load.

According to the embodiments of the present invention, the arm 46 and the driving mechanism 5 is assembled to the base plate portions 31, respectively. However, the arm 46 and the driving mechanism 5 can be assembled to the cushion frame 41.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A seat vertical position adjusting device comprising:
   a seat cushion applied with a load when an occupant is seated thereon;
   a base plate portion supporting the seat cushion;
   a cushion frame housed in the seat cushion and supported by the base plate portion so as to be movable in a vertical direction;
   a driving mechanism equipped to one of the cushion frame and the base plate portion for driving the cushion frame to be movable in the vertical direction relative to the base plate portion, the driving mechanism including:
   a shaft having a first axial portion and a second axial portion which is positioned on the first axial portion, eccentrically rotated relative to the first axial portion, and connected to a driving member;
   a stationary gear member fixed to the one of the cushion frame and the base plate portion, mounted on one side of the first axial portion, and having a first internal gear;
   a driving arm connected to the other one of the cushion frame and the base plate portion, mounted on the other side of the first axial portion, having a second internal gear of which a number of gear teeth is different from a number of gear teeth of the first internal gear, and disposing the second axial portion between the driving arm and the stationary gear member; and
   a pinion gear mounted on the second axial portion and engaged with the first and second internal gears.

2. A seat vertical position adjusting device according to claim 1, wherein the second axial portion is positioned at an axially central portion of the first axial portion.

3. A seat vertical position adjusting device according to claim 1, wherein an addendum modification coefficient of the first internal gear is different from an addendum modification coefficient of the second internal gear.

4. A seat vertical position adjusting device according to claim 3, wherein the number of gear teeth of the first internal gear is less than the number of gear teeth of the second internal gear at least by one.

5. A seat vertical position adjusting device according to claim 4, wherein the first internal gear, the second internal gear, and the pinion gear possesses the same tooth module.

6. A seat vertical position adjusting device according to claim 1, wherein the driving member is an operation handle or an electric motor, wherein the driving arm is rotated in response to operation of the operation handle or driving of the electric motor.

7. A seat vertical position adjusting device according to claim 1, wherein the driving mechanism further includes:
   a first shoulder portion provided at the driving arm; and
   a first pin for fixing the driving mechanism to the one of the cushion frame and the base plate portion, wherein a rotation in a direction of the driving arm is limited when the first shoulder portion becomes in contact with the first pin.

8. A seat vertical position adjusting device according to claim 7, wherein the driving mechanism further includes:
   a second shoulder portion provided at the diving arm; and
   a second pin for fixing the driving mechanism to the one of the cushion frame, and the base plate portion, wherein a rotation in a reverse direction of the driving arm is limited when the first shoulder portion becomes in contact with the second pin.

9. A seat vertical position adjusting device according to claim 1, further comprising:
   a driven arm assembled to the one of the cushion frame and the base plate portion, and connected to the other one of the cushion frame and the base plate portion, the driven arm being rotatable in response to a rotation of the driving arm;
   an elongated hole defined at a side wall of the seat cushion for connecting the driven arm and the driving arm to the seat cushion by means of a pin; and
   an interconnecting bar connecting the driven arm and the driving arm, wherein the seat cushion is moved in the vertical direction in response to the rotation of the driving arm and the driven arm.

10. A seat vertical position adjusting device according to claim 9, wherein the interconnecting bar connects the driven arm and the driving arm with a welding method.

11. A seat vertical position adjusting device comprising:
a seat cushion applied with a load when an occupant is seated thereon;
a pair of base plate portions arranged at each side of the seat cushion and opposing to each other;
a cushion frame housed in the seat cushion and supported by the pair of base plate portions so as to be movable in a vertical direction;
a driven arm assembled to one of the cushion frame and one of the pair of base plate portions and connected to the other one of the cushion frame and the one of the pair of base plate portions;
a driving mechanism equipped to one of the cushion frame and the other one of the pair of base plate portions, the driving mechanism including:
a shaft having a first axial portion and a second axial portion which is positioned on the first axial portion, eccentrically rotated relative to the first axial portion, and connected to a driving member;
a stationary gear member fixed to the one of the cushion frame and the other one of the pair of base plate portions, mounted on one side of the first axial portion, and having a first internal gear;
a driving arm connected to the other one of the cushion frame and the other one of the pair base plate portions, mounted on the other side of the first axial portion, having a second internal gear of which number of gear teeth is different from the number of gear teeth of the first internal gear, and disposing the second axial portion between the driving arm and the stationary gear member; and
a pinion gear mounted on the second axial portion and engaged with the first and second internal gears;
a pair of elongated holes defined at side walls of the seat cushion for connecting the driving arm, which is connected to the other one of the cushion frame and the other one of the pair base plate portions, to the seat cushion by means of a pin and for connecting the driven arm, which is connected to the other one of the cushion frame and the one of the pair of base plate portions, to the seat cushion by means of a pin; and
an interconnecting bar connecting the driven arm and the driving arm, wherein the seat cushion is moved in the vertical direction in response to rotation of the driving arm and the driven arm.

12. A seat vertical position adjusting device according to claim 1, wherein the interconnecting bar connects the driving arm and the driven arm with a welding method.

13. A seat vertical position adjusting device according to claim 1, wherein the driven arm is assembled to the one of the pair of base plate portions, the driving mechanism including the driving arm and the stationary gear member is equipped to the other one of the pair of base plate portions, and the driven arm and the driving arm are rotatably connected to the cushion frame, wherein the seat cushion is moved in the vertical direction in response to the rotation of the driving arm and the driven arm connected to the driving arm via the interconnecting bar.

14. A seat vertical position adjusting device according to claim 13, wherein the second axial portion is positioned at an axially central portion of the first axial portion.

15. A seat vertical position adjusting device according to claim 14, wherein an addendum modification coefficient of the first internal gear is different from an addendum modification coefficient of the second internal gear.

16. A seat vertical position adjusting device according to claim 15, wherein the number of gear teeth of the first internal gear is less than the number of gear teeth of the second internal gear at least by one.

17. A seat vertical position adjusting device according to claim 16, wherein the first internal gear, the second internal gear, and the pinion gear possesses the same tooth module.

18. A seat vertical position adjusting device according to claim 11, wherein the driving member is an operation handle or an electric motor, wherein the driving arm is rotated in response to operation of the operation handle or driving of the electric motor.

19. A seat vertical position adjusting device according to claim 11, wherein the driving mechanism further includes:
a first shoulder portion provided at the driving arm; and
a first pin for fixing the driving mechanism to the one of the cushion frame and the other one of the pair of base plate portions, wherein a rotation in a direction of the driving arm is limited when the first shoulder portion becomes in contact with the first pin.

20. A seat vertical position adjusting device according to claim 19, wherein the driving mechanism further includes:
a second shoulder portion provided at the driving arm; and
a second pin for fixing the driving mechanism to the one of the cushion frame and the base plate portion, wherein a rotation in a reverse direction of the driving arm is limited when the first shoulder portion becomes in contact with the second pin.

* * * * *